May 30, 1939.   A. E. KROGH   2,159,971
CONTROL APPARATUS
Filed April 22, 1936   6 Sheets-Sheet 1

INVENTOR.
ANKER E. KROGH
BY George M. [signature]
ATTORNEY

May 30, 1939.  A. E. KROGH  2,159,971
CONTROL APPARATUS
Filed April 22, 1936   6 Sheets-Sheet 2
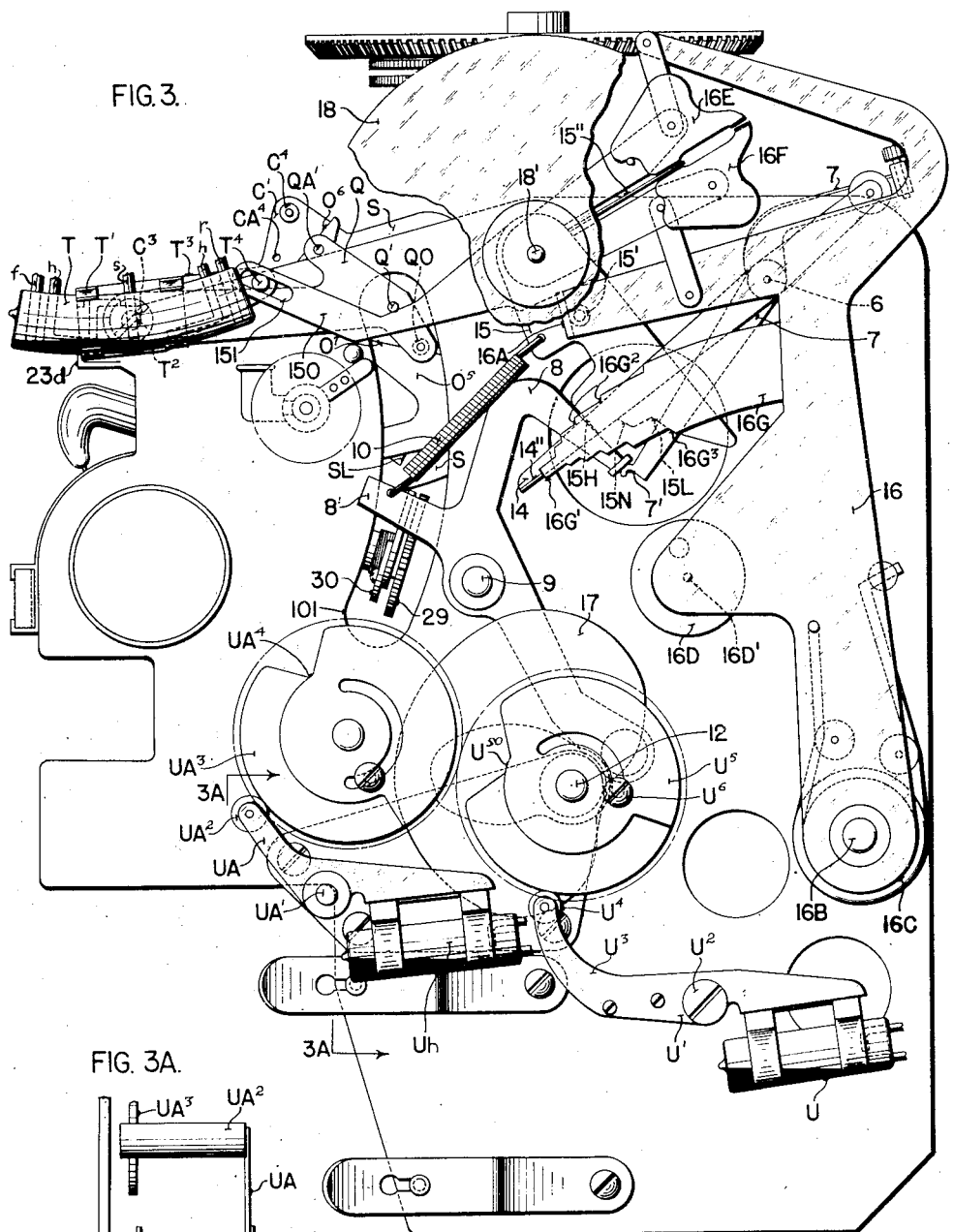
FIG. 3.
FIG. 3A.
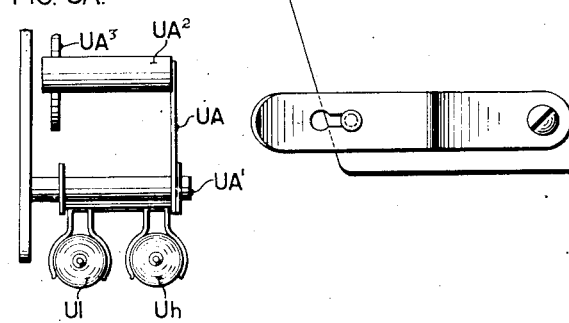
INVENTOR.
ANKER E. KROGH
BY George M. Wurchamp
ATTORNEY May 30, 1939. A. E. KROGH 2,159,971
CONTROL APPARATUS
Filed April 22, 1936 6 Sheets-Sheet 4
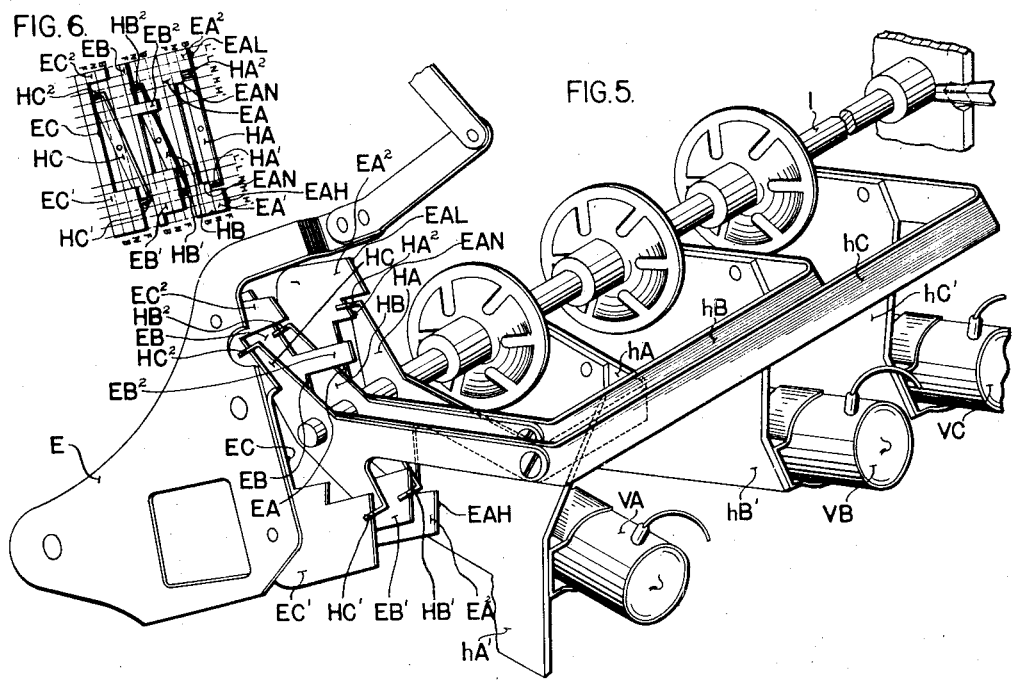
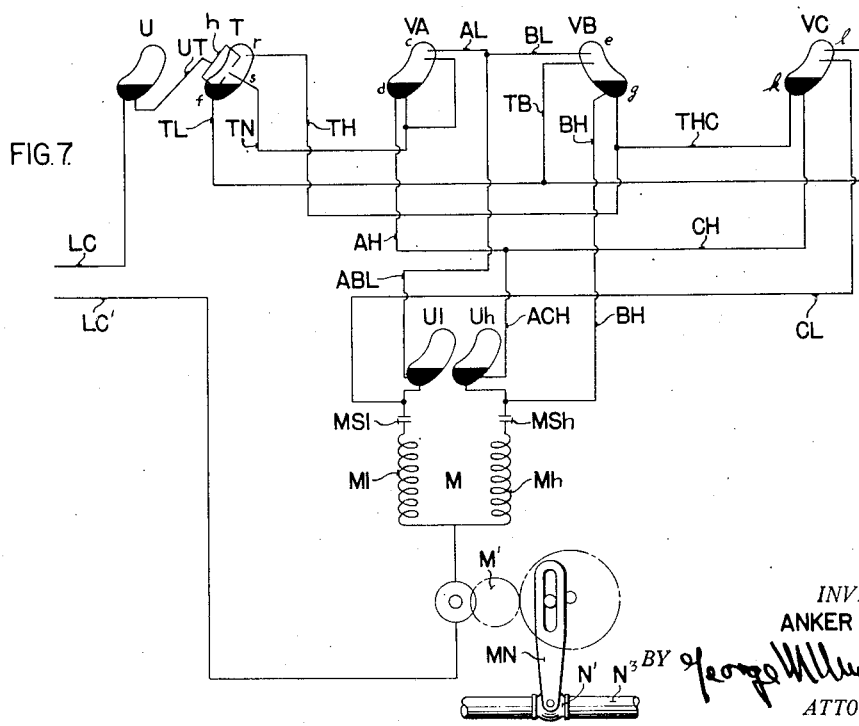
INVENTOR.
ANKER E. KROGH
BY George W. Merchamp
ATTORNEY May 30, 1939.  A. E. KROGH  2,159,971
CONTROL APPARATUS
Filed April 22, 1936   6 Sheets-Sheet 5
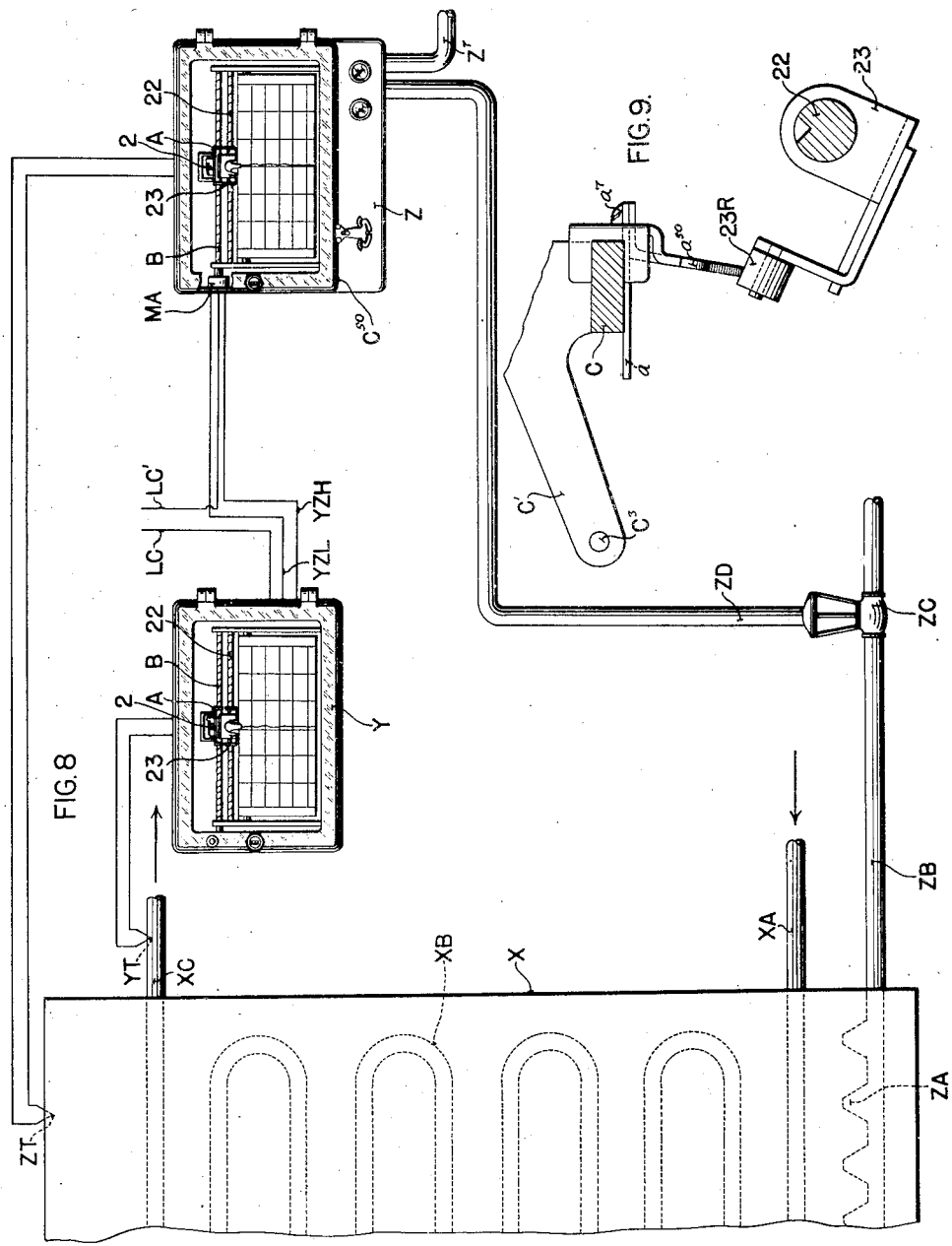
INVENTOR.
ANKER E. KROGH
BY
ATTORNEY

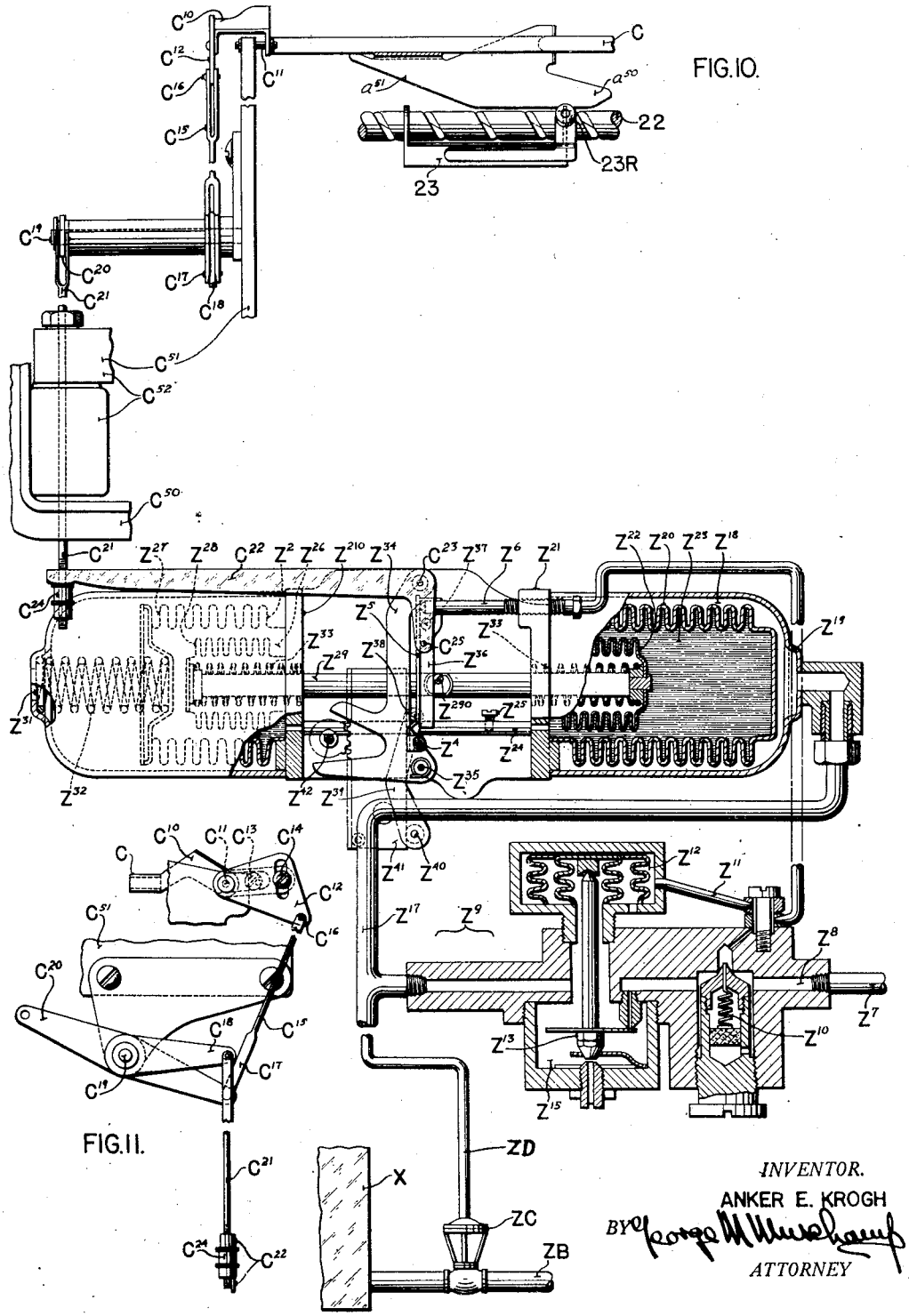

Patented May 30, 1939

2,159,971

UNITED STATES PATENT OFFICE 2,159,971

CONTROL APPARATUS

Anker E. Krogh, Philadelphia, Pa., assignor to The Brown Instrument Company, Philadelphia, Pa., a corporation of Pennsylvania Application April 22, 1936, Serial No. 75,704

29 Claims. (Cl. 236—14)

This application relates to control apparatus and more particularly to control apparatus for controlling a variable condition, such as pressure, temperature, humidity, flow or the like, to maintain a predetermined value of said condition.

A general object of my invention is to provide improved apparatus designed to effect control actuations in response to deviations of a deflecting meter element from a predetermined position, and to set into operation, in response thereto, agencies tending to return said element to said predetermined normal position.

A more specific object of my invention is to provide improved control instrumentalities, operating in response to changes in a variable condition to control the latter within close limits, and characterized by their robust construction and adaptability for heavy duty service, as is required in such industrial plants, for example, as steel mills, oil refineries, and the like.

Further objects of my invention are to provide modifications of, and improvements in control instrumentalities disclosed in the Harrison Patent 1,946,280, granted February 6, 1934, whereby control elements such as mercury switches are actuated to effect desired control actions in response to the deviations of a variable condition from its normal value.

Although adaptable to other uses, my invention is of special utility in connection with potentiometric measuring apparatus comprising a galvanometer deflecting in accordance with potentiometric unbalance resulting from a change in value in a condition measured by said apparatus and automatic potentiometer rebalancing means serving also to adjust an indicator or recorder member. When so used my invention may include the control of mercury switches or analogous control devices jointly in response to the deflections of the galvanometer and the deflections of the indicator or recorder member. I disclose herein means cooperating with the galvanometer or the like in such control instrumentalities, which contributes to a high degree of precision of control and flexibility. Control mechanisms embodying means to prevent excessive deviations of the controlled condition are commonly referred to as "anti-hunting" controllers, and my invention is concerned especially with such controllers.

One embodiment of my invention, peculiarly adapted for certain uses, comprises an "interlock" control system, which comprises two control instruments of different types, separately responsive to different but related conditions of a process jointly controlled by the two instruments, and which is characterized by the especial availability of the controllers for the control operations respectively assigned to them.

Other objects and advantages of the invention will appear from the description following when, taken in connection with the accompanying drawings, whereof:

Fig. 3 is a side elevation, as seen from the right of Fig. 1 of said control instrument showing the outside of one instrument framework and plate;

Fig. 3A is a detail section on the line 3A—3A of Fig. 3;

Fig. 5 is a perspective view of control switches and associated mechanism of the instrument shown in Figs. 1—4.

Fig. 6 is a more or less diagrammatic view of certain switch actuating parts.

Fig. 7 is a wiring diagram including certain instrument control switches;

Fig. 8 illustrates a control system including two control instruments of different types;

Fig. 9 is an elevation in section, of a portion of one of the two instruments shown in Fig. 8; and Figs. 10 and 11 are somewhat diagrammatic views of portions of the apparatus shown in Fig. 8.

Figure 1:
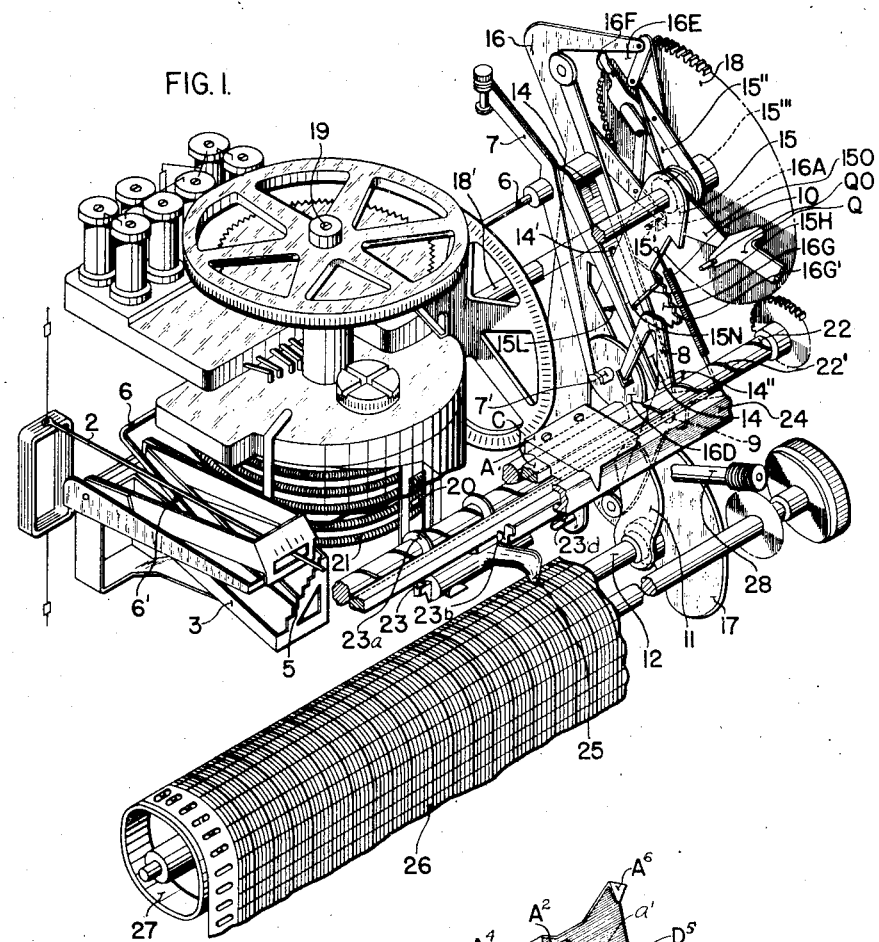
Fig. 1 is a perspective view of one position.

The recording potentiometer instrument shown in perspective in Figs. 2—6, and significant operative parts of which are illustrated in Fig. 1, includes a galvanometer, the pointer 2 of which deflects in response to a condition of unbalance in the potentiometer measuring circuit which may be of any well known form including the resistance 21 which may be adjusted to rebalance the potentiometer. The instrument also comprises mechanical relay provisions operated by a constantly rotating driving motor, not shown, and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions the instrument shown in Figs. 1—6 is of the form disclosed in an application for patent Serial No. 546,290, filed June 23, 1931, jointly by Ernest H. Grauel, Ernest Kessler and Thomas R. Harrison, and in respect to the type of control mechanism employed herein I make use of certain instrumentalities disclosed in the previously mentioned Harrison patent.

The control provisions, which in their construction and arrangement, and in their combination with the above-mentioned rebalancing and carriage adjusting and control mechanism, constitute the features of the present invention, include a control table A and means by which control switches are periodically actuated by said mechanism, when the recorder carriage 23 is displaced in one direction or the other from the control table. The control table A is normally stationary but may be manually adjusted along the path of movement of the carriage 23. The position of the control table along said path corresponds to, and determines the normal value of the quantity measured, while the position at any instant, of the carriage 23 corresponds to, and constitutes a measure of, the current value of said quantity.

The mechanism of the instrument of Fig. 1 through which the deflection of the galvanometer pointer 2 controls the adjustments of the recorder carriage 23 and the rebalancing of the potentiometer circuit on a variation in the quantity or value measured by the galvanometer comprises a pointer engaging and position gauge element 3. The latter is pivotally supported and in connection with the hereinafter mentioned shaft 6 has a loading tendency, which may well be due partly to spring and partly to gravitational action, to turn upward into the position in which one or another of the shoulders 5 of the member 3 engage the pointer 2. The element 3 is engaged by, and turns, with the arm 6¹ of a rock shaft 6. A spring 10 tends to hold a rocker 8 which is journalled on a pivot 9, in the position in which the rocker engages an arm 7 secured to the shaft 6 and thereby holds the latter in a position in which the shoulders 5 are all below the pointer 2.

A cam 11 which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less according to the deflective position of the pointer 2 at the time. When the arm 7 thus turns counter-clockwise, a lateral projection 7¹ of that arm engages and turns a secondary pointer element 14 into a position corresponding to the then deflection of the pointer 2. The secondary pointer 14 is loosely journalled on the shaft 6, and has a gravitational loading tendency to turn in the clockwise direction as seen in Fig. 1, so that the arm 14 normally bears against the projection 7¹ of the arm 7.

At the end of each angular adjustment of the secondary pointer 14 into a position corresponding to the then deflection of the galvanometer 2, one or another of the three shoulders 15H, 15N and 15L of a locking member 15, engages the bottom wall of a slot 14¹ in the member 14 and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15¹ of a projection 16A carried by a ratchet lever 16 pivoted at 16B.

A spring 16C gives the lever 16 a tendency to turn forward in the clockwise direction as seen in Fig. 1, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15 when in locking engagement with the secondary pointer 14, controls the action of the pawls 16E and 16F by virtue of the fact that a collar or hub portion 15¹¹¹ of the part 15 carries a spring pawl engaging arm 15″. The movement of the locking part 15 into the position in which its shoulder 15H engages the secondary pointer 14 causes the arm 15″ to move the pawl 16E into operation engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15″ shifts the pawl 16F into operative engagement with the wheel 13, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14″ of the secondary pointer 14 and thereby arrest the forward movement of the ratchet lever 16. In the neutral position of the galvanometer pointer and secondary pointer 14, the projection 14″ of the latter engages the central shoulder 16G¹ of the arm 16G and the lever 16 is then held against any operative movement in the clockwise direction. When the secondary pointer position is more or less to one side or the other of its neutral position, the portion 14" engages an upper or lower shoulder 16G$^2$ or 16G$^3$ more or less distant from the central shoulder 16G$^1$ and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18$^1$ on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection away from the galvanometer pointer in one direction rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22 which is formed with a thread groove 22' of coarse pitch which receives a cam or mutilated screw thread rib 23$^1$ secured to the carriage 23, so that the latter is moved longitudinally of the shaft 22 as the latter is rotated.

The marker carriage 23 comprises a frame portion formed of a single piece of sheet metal cut and bent to form a flat underbody portion with uprising projections. Those projections include two apertured ears 23a at the rear corners of said body portion transverse to and through which the shaft 22 extends; two projections 23b, one at each front corner of said body portion which bear against the inner edge and upper side of the lower flange of a channel bar or rail 24 forming part of the instrument framework, and three intermediate projections 23c which extend in vertical planes transverse to, and are arranged in a row parallel to, the shaft 22 and rail 24. In addition the body portion of the carriage frame is provided with a forwardly extending tongue passing beneath the rail 24 and terminating in an uprising pointer or index 23d adapted to cooperate with a scale marked on the front face of the rail 24 to indicate the position of the pen carriage, and the value of the quantity measured and recorded by the instrument.

The record sheet 26 passes over and is given feeding or advancing movements by a record feed roll 27. The latter is intermittently rotated by means of a worm and screw connection between the shaft of the roll 27 and a transverse shaft 28. Shaft 28 is intermittently actuated by means of a ratchet and lever device 30 which is engaged and oscillated by the arm 8' of the rocker 8 on each oscillation of the latter.

Figure 2:
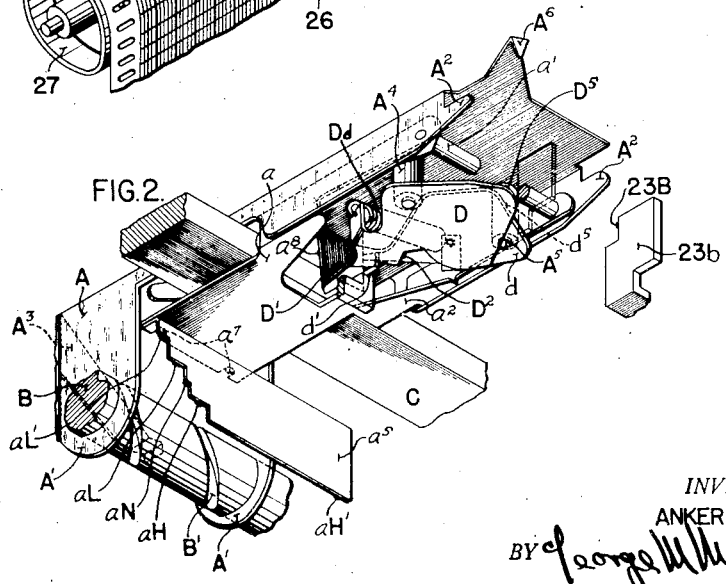
Fig. 2 is a perspective view of another portion of a control instrument; as seen from the lower left of Fig. 1.

The control table A of the instrument shown in Figs. 1 and 2 comprises a sheet metal frame having ear portions A' apertured for the passage of a shaft B mounted in the instrument framework alongside the shaft 22 and having bearing parts A$^2$ which engage and slide along the upper flange of the rail 24. To facilitate the adjustment of the control table A along the path of travel of the pen carriage 23, the shaft B is shown as formed with a thread groove B$^1$ receiving a cam or mutilated thread rib part A$^3$ secured to the control table frame. The shaft B may be rotated to adjust the control table automatically or manually as by means of a transverse shaft geared to the shaft B and rotated by an operating handle or knob at the front of the instrument. An index A$^6$ in conjunction with a scale on the front face of the rail 24 may indicate the adjustment of the table and the corresponding normal value of the quantity measured.

A member a is hinged at one edge to the frame of the control table A by a pivot or pintel shaft a$^1$ extending parallel to the shaft B. The member a is formed with guiding provisions including a part a$^2$, for a bar-like part C which extends parallel to the shaft B and is rigidly secured at its ends to arms C$^1$ at opposite ends of the instrument which are pivotally connected at C$^3$ to the instrument framework so that the yoke like structure formed by the bar C and arms C$^1$ may turn with respect to the instrument framework about an axis coinciding with that of the hinge connection a$^1$, between the table A and part a. The part a and bar C are held by the said guiding provisions against independent turning movements about the axis of their respective pivotal supports. The part a and bar C have a gravital tendency to move from their highest positions, above that shown in Fig. 4 into or toward their lowermost positions. Their movement downward below their last-mentioned positions is prevented by the engagement of a projection C$^4$ from the arm C$^1$ with an adjacent portion of the instrument framework. The parts a and C are positively held in their uppermost positions by the action of a link O$^5$. As will hereinafter appear, link O$^5$ is given rising movements during which the edge O$^6$ of link O$^5$ will engage and raise the projection C$^4$ of arm C$^1$ carrying the latter to its highest or clearance position. The extent to which the parts a and C are permitted to swing downwardly from their uppermost positions during each period when the action of the cam 11 renders the link O$^5$ temporarily inoperative, depends upon the then relative positions of the table A and the recorder carriage 23. When the value of the quantity measured is so low that the carriage 23 is entirely at the low side (left-hand side as seen in Fig. 1) of the control table A, the carriage 23 does not interfere with the movement of the parts a and C into their lowermost positions.

Figure 4:
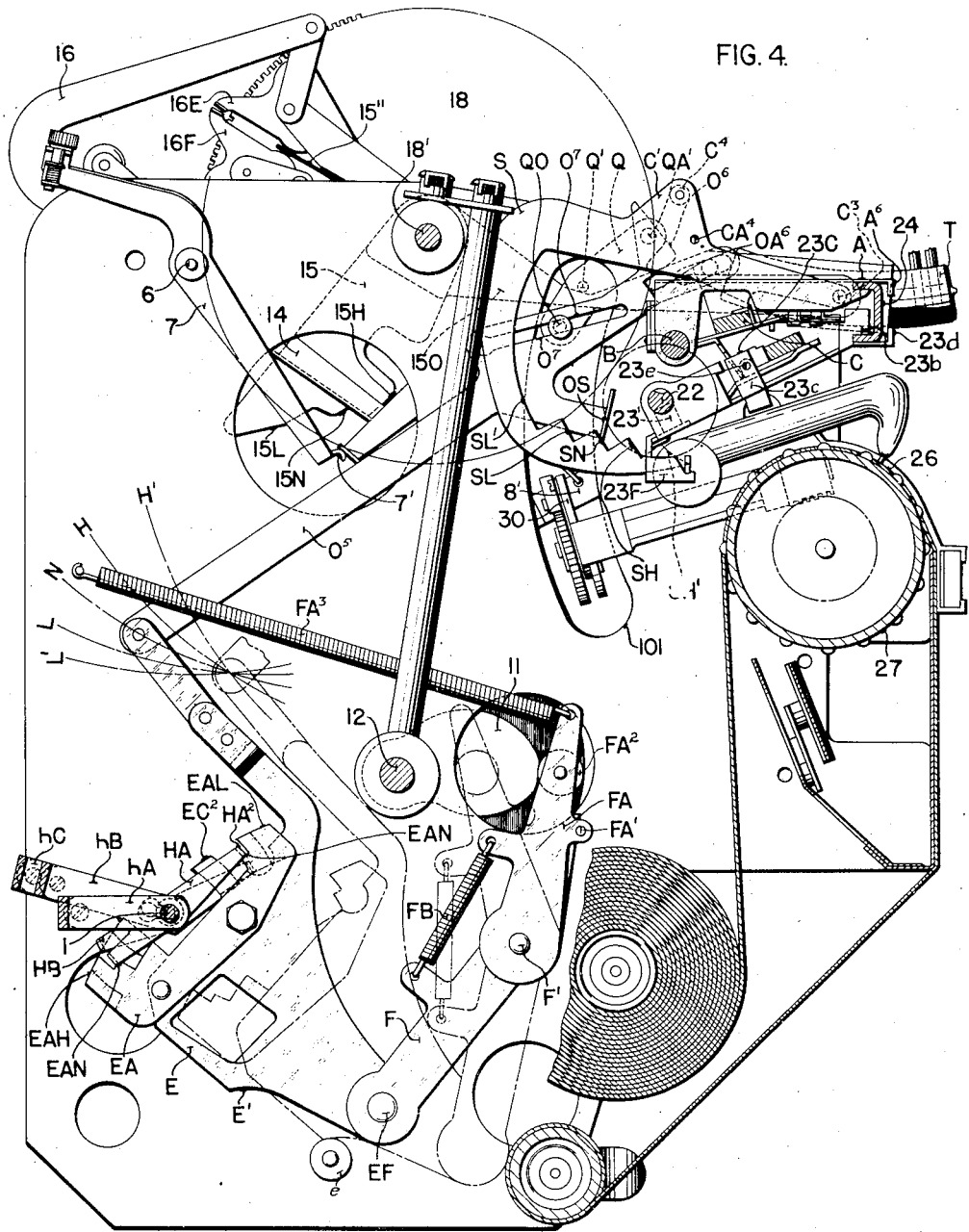
Fig. 4 is a transverse section of the instrument, as seen from the left of Fig. 1.

When the current value of the quantity measured is suitably close to the normal value of that quantity, the control table and marker carriage 23 are in such relative positions that downward movement of the hinged part a is prevented or restricted by the engagement of a portion of that part with the marker carriage 23. For the purpose of such engagement the part a, as shown in Figs. 2 and 4, has a carriage engaging portion a$^5$ detachably secured to it. The part a$^5$ is in the form of a plate with a downwardly projecting body portion terminating in a lower horizontal edge aH$^1$, and a series of steps aH, aN, aL and aL$^1$ vertically removed from edge aH$^1$ but parallel thereto and having at its upper edge a lateral flange portion bearing against the underside of the part a at the rear edge of the latter and detachably secured thereto by clamping screws a$^7$. The bodies of said screws pass through slots in the part a which are open at the rear edge of the latter.

The lower edge aH$^1$ of the projection a$^5$ is so disposed that it may engage and rest upon the shoulder 23C formed by the upper edge of the projection 23c at the high side of the recorder carriage 23 (the right-hand side as seen in Fig. 1), when the position of said carriage is such as to hold the shoulder 23C beneath said edge $aH^1$. In the condition just described the control table part $a$ cannot move downward below the position in which edge $aH^1$ contacts shoulder 23C which is the upper operating position of the part $a$. The movements of the part $a$ above this position are inoperative movements insofar as the actuation of the control devices is concerned. The uppermost position of the part $a$ above this position may be called a clearance position since in that position, part $a$ cannot interfere in any way with movements of the carriage 23, all of which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting a latch member D, into its latching position. The latch D is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud $A^5$ depending from the underside of the control table frame alongside the stud $A^4$, and a spring $Dd$ connecting the members D and $d$. The spring $Dd$ tends to move the member D in the counter-clockwise direction as seen in Fig. 2 and to move the member $d$ in the opposite direction about their respective pivotal supports $A^4$ and $A^5$; such turning movements of the members D and $d$ are prevented by the engagement of the finger portion $d'$ of the part $d$ with the shoulder $D'$ of the member D, when the latter is in its latching position as shown in Fig. 2. In the non-latching position of the member D, the finger $d'$ engages a shoulder $D^2$ of the part D.

The members D and $d$ are moved from the latched position shown in Fig. 2 into the unlatched position and back again into the position shown in Fig. 2 by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge $d^5$ to turn the member $d$ counterclockwise, as seen in Fig. 2 so that the spring $Dd$ may then move the member D into its latching position in which its shoulder $D'$ engages the finger $d'$. When the carriage 23 subsequently moves back from its high position, the shoulder 23B engages edge $D^5$ of the member D and moves the latter into its non-latching position while permitting the spring $Dd$ to move the member $d$ into the position in which its finger $d'$ engages the shoulder $D^2$ of the member D, and holds the latter in its non-latching position.

When the value of the measured condition is at normal, which will occur when the index $23d$ of the carriage 23 is adjacent the index $A^6$ of the table A, the projection 23C of the carriage 23 will be so disposed with relation to the table A that upon a downward movement of the part $a$, the step $aN$ of the part $a^5$ will engage said projection. A slight increase in the value of the quantity measured will result in a deflection of the carriage 23 to the right as seen in Fig. 2 in which position a downward movement of the part $a$ will result in engagement of the step $aH$ with projection 23C, a further deflection of carriage 23 to the right or the high side will cause engagement of the step $aH^1$ with projection 23C when part $a$ is depressed as previously described. On a slight decrease in the value of the quantity measured, from the position in which the projection 23C is disposed beneath the step $aN$, the projection 23C will be in a position in which it is adapted to be contacted by the step $aL$ upon a downward movement of the part $a$, and upon a further decrease in the quantity measured resulting in further deflection of the carriage 23 to the left as seen in Fig. 2 the projection 23C will be in a position in which it is adapted to be engaged by the step $aL^1$. Further deflection of the carriage 23 to the low or left hand side will carry the projection 23C beyond the province of the part $a$ and in this position the part $a$ will not be intercepted by the projection 23C but the part $a$ will be permitted its full downward motion as limited by engagement of the projection $C^4$ of the member $C^1$ with the top edge of the instrument side plate. The lowest limit to which table part $a$ is permitted to fall when projection $C^4$ engages the side plate is also the limit to which part $a$ falls when step $aL^1$ engages projection 23C.

The above described cooperation of the control table A and the pen carriage 23 may be utilized to directly effect control action as desired but it is the object of the present invention to combine with the action resulting from the cooperation of the control table and the pen carriage, further control functions contributing to a finer degree of control than would be possible with the former alone. The action due to the cooperation of table A and carriage 23 just described might be termed a magnitude function since it is an action in response to the total deviation of the quantity from a predetermined value. I desire to combine with the magnitude function further functions as will be hereinafter made clear. As previously described, the mechanical relay provision of Fig. 1 rebalances the potentiometric circuit, to the unbalance of which the galvanometer pointer 2 is responsive, and accordingly the rebalancing operations restore or tend to restore the galvanometer pointer 2 to its neutral position or null point. The rebalancing operations occur at regular intervals so that the periodic restoration to and deflection from neutral of the galvanometer pointer 2 renders the extent of deflection of the latter when clamped at regular intervals, susceptible of translation into a control action which is a function of the rate of change of said quantity. In the mechanism hereinafter described, a control operation is combined either with the magnitude function alone or with the magnitude and rate of change functions jointly.

The means by which the existing deflection of the galvanometer pointer 2 comprising the rate of change component, is measured and combined with the deviation component resulting from the cooperation of the control table A and the carriage 23 includes stop and guiding members for a link $O^5$ shown in Fig. 4 and a floating member E connected to said link. The member E is pivotally connected at EF to the part F of a compound lever comprising parts F and FA each pivoted to the instrument framework at $F^1$ and normally held against relative movements by a spring FB. The latter tends to hold the part F in engagement with a projection $FA^1$ of the part FA, but serves as a safety device which may yield to prevent injury of the part in case the switch parts actuated by the member should jam. A spring $FA^3$ extends between the upper end of lever part FA and the instrument framework and tends to hold the parts F, FA and E in the position shown in dotted lines in Fig. 4. The lever FA is moved from the dotted line position into the full line position in Fig. 4 once during each rotation of the shaft 12 by the cam 11 which then engages a cam roller $FA^2$ carried by the lever part FA.

When the parts are in the position shown in dotted lines in Fig. 4, the lower cam edge $E^1$ of the member E rests upon a roller support e mounted on the instrument framework, and the position of the member E is then such that the link $O^5$ is raised to an initial or clearance position from which it is subsequently permitted to descend. When the lever part F is turned in the clockwise direction from its Fig. 4 dotted position the weight of link $O^5$ and member E causes the latter to rotate about pivot EF, moving link $O^5$ downward until intercepted by engagement of its upper end with the cooperating control mechanism.

The control mechanism comprising the leveling and guiding means for the link $O^5$ includes an extension 150 of the member 15, a lever Q and extension S of arm $C^1$. The lever Q, which is the element by which the rate of change component is introduced into the collective control action, is journalled to the instrument framework at $C^3$ and carries a pin QO adapted to be engaged by slot $O^7$ of link $O^5$ whereby the up and down movements of the latter are guided over one or another path depending upon the position of pin QO. Pin QO extends through the aperture 101 in the instrument side plate. Lever Q has a gravitational tendency to fall downward into a position in which the pin $Q^1$ thereof engages the upper edge of extension 150 of member 15. As explained in connection with Fig. 1 the member 15 once in each cycle of operation of the instrument, assumes a position depending upon the then position of the galvanometer with respect to its normal position. The member 15 will be in a neutral position wherein step 15N engages the secondary pointer 14 when permitted to do so, if the galvanometer is then at its neutral position indicating a stationary condition of the measured quantity. A trend of the measured quantity above or below its then value will result in an engagement of step 15H or 15L of the member 15 with the pointer 14 thereby positioning the extension 150 of the member 15 to one or the other side of said neutral position. Each of the positions in which the lever Q is held by extension 150 defines a position for the pin QO of the member Q thereby forming three generally vertical paths for the link $O^5$.

The downward movement of the link $O^5$ over one of another of its three paths as determined by the pin QO will be terminated by engagement of the projection OS of the link $O^5$ with one of a series of steps $SL^1$, SL, SN, SH, or $SH^1$, of the extension S of the arm $C^1$. The extension S will be angularly positioned about the center $C^3$ upon each downward movement of the part a, into one of five positions depending upon which of the steps $aL^1$, aL, aN, aH, or $aH^1$, of the part a is intercepted by the projection 23C of the carriage 23. The particular one of the steps of the extension S which is engaged by the projection OS of the link $O^5$ will therefore be determined jointly by the path over which the link $O^5$ travels in the downward movement of the latter as determined by the then position of the pin QO and upon the angular position of the extension S about the pivot $C^3$. When the step 15N of the member 15 engages the secondary pointer 14, as it will when the trend of the condition is stationary, and the step aN of the part a is then in engagement with the part 23C of the carriage 23, the step SN of the extension S will be engaged by the projection OS of the link $O^5$ in the downward movement of the latter.

As previously described, the downward movement of the link $O^5$ is caused by the weight of the parts as the member E moves to the left in Fig. 4 and the cam edge $E^1$ is formed with a sharp initial drop so that link $O^5$ rapidly moves into contact with extension S upon the beginning of the movement to the left of member E. Further counterclockwise movement of the member E as seen in Fig. 4 with the projection OS of the link $O^5$ in engagement with the step SN of the extension S will result in deflection of the member E over the middle path indicated diagrammatically as N in Fig. 4, of a plurality of paths of which in the present embodiment there are five. So long as the trend of the condition is stationary the pin QO will be in the position just described at the commencement of each downward movement of the link $O^5$ and the particular step of extension S which is then engaged by the projection OS will then be determined solely by the position of the pen carriage 23 with respect to the control table A and thereby in accordance with the value of the measured condition with respect to the normal value of the latter. If the downward movement of the part a results in engagement of its step aL with the projection 23C, the step SL of extension S will be positioned in the path of the projection OS in the down travel of the link $O^5$. If, in the downward travel of the part a, the step $aL^1$ of the latter is engaged by the projection 23C, the step $SL^1$ of the extension S will be then positioned in the path of the projection OS. Upon a rise in the magnitude of the measured condition whereby the down movement of the part a results in engagement of the step aH with the projection 23C the step SH of the extension S will be positioned in the path of the projection OS and upon a further deflection of the carriage 23 to the high side whereby the step $aH^1$ of the part a contacts the projection 23C, or part a is latched up, the step $SH^1$ of the extension S will be positioned in the path of the projection OS of the link $O^5$. As will be clear from Fig. 4, movement of member E to the left with link $O^5$ in engagement with steps SH, $SH^1$, SL or $SL^1$, of member S, will result in member E deflecting over paths H, $H^1$, L and $L^1$ respectively of Fig. 4.

If the trend of the condition is rising or falling the step 15H or the step 15L of the member 15 will engage the secondary pointer 14 upon the counterclockwise movement of the member 15 as seen in Fig. 4 and the resultant change in the position of the pin QO will determine a path for the link O⁵ which, for a given position of extension S, will result in engagement of its projection OS with a different step of the extension S than would be engaged when the member 15 is in its neutral position.

With the step 15H of the member 15 in engagement with the secondary pointer 14 the pin QO will be turned to a position clockwise of the neutral position illustrated in Fig. 4 thereby moving the projection OS transversally of the path of the link O⁵ so that projection OS is moved into alignment with a step of the extension S which is one step further removed to the high side than is the case when the pin QO is in its neutral position. Thus with the part $a$ of the table A in such position that its step $aN$ engages the projection 23C, and the member 15 in such position that its step 15H is in engagement with the secondary pointer 14 the down movement of the link O⁵ will result in engagement of the projection OS with the step SH of extension S. With the step 15H in engagement with the secondary pointer 14 but the step $aH$ of the part $a$ in engagement with the projection 23C the down movement of the link O⁵ will result in engagement of the projection OS with the step SH¹ of the extension S. With the step 15H in engagement with the secondary pointer 14 and the step $aH^1$ of the part $a$ in engagement with the projection 23C the subsequent downward movement of the link O⁵ will again result in engagement of the projection OS with the step SH¹ of extension S. In the last mentioned condition of the parts it will be understood that I might extend the operation by providing an additional step on extension S and might modify the part $a$ and extension S to extend the operation indefinitely, but I prefer to make the actuation resulting from the engagement of projection OS with the step SH¹ the maximum actuation in that direction.

Similarly when step 15L of the member 15 is in engagement with the secondary pointer 14, the pin QO will be moved to a position counterclockwise of the neutral position of Fig. 4 and with step $aN$ of part $a$ in engagement with the projection 23C, the step SL of extension S will be in the path of the projection OS of link O⁵. With step 15L in engagement with the secondary pointer 14 the engagement of step $aL$ of the part $a$ with projection 23C will result in engagement of the projection OS of link O⁵ with step SL¹ of the extension S upon downward movement of the link O⁵. With step 15L in engagement with pointer 14 and step $aL^1$ in engagement with projection 23C, the projection OS will again engage step SL¹ of extension S, the latter being the lowest step provided in this embodiment.

Each of the positions of the link O⁵ in engagement with a step $aL^1$, $aL$, $aN$, $aH$ or $aH^1$ of the extension S, above referred to, will determine a different path for the member E in its movement to the left in Fig. 4 which will correspond respectively to the paths L¹, L, N, H and H¹ diagrammatically shown in Fig. 4.

The paths indicated in Fig. 4 which are selectively taken by the member E in accordance with the foregoing may be conveniently tabulated as follows in which $aH^1$, $aH$, $aN$, $aL$ and $aL^1$ indicates the step of part $a$ then in contact with projection 23C, and 15H, 15N and 15L indicates the step of member 15 then in contact with pointer 14.

Table No. 1

| Trend (Part 15) | Value (Part a) | | | | |
|---|---|---|---|---|---|
| | High+ $aH^1$ | High $aH$ | Normal $aN$ | Low $aL$ | Low− $aL^1$ |
| Rising (15H) | H¹ | H¹ | H | N | L |
| Stationary (15N) | H¹ | H | N | L | L¹ |
| Falling (15L) | H | N | L | L¹ | L¹ |

The movement of the member E to the left in Fig. 4 will thus be terminated with the latter in one of five positions and the member E may be utilized to actuate any of various known control devices in deflecting over the selected one of its five control paths. I preferably actuate three switches indicated as VA, VB and VC.

The means for actuating the switches VA, VB and VC through member E may, as shown in Figs. 4, 5 and 6, include three switch actuating members EA, EB and EC, all effectively integral with the member E, and adapted to cooperate with three arms HA, HB and HC, the latter of which are journalled upon the shaft I. Arms HA, HB and HC are attached to yoke members $hA$, $hB$ and $hC$ respectively, to the latter of which are secured the downwardly extending switch holding brackets $hA^1$, $hB^1$ and $hC^1$ carrying switches VA, VB and VC respectively. Switches VA, VB and VC, as shown, are mercury switches of the well known type comprising an envelope with a quantity of mercury therein adapted to shift within the envelope, and bridge metal contacts disposed within the latter. Each of the switches VA, VB and VC is adapted when tilted in one direction, to bridge two contacts disposed in one end of the envelope, when tilted in the opposite direction, to bridge two contacts disposed in the opposite end of the envelope and when in a position intermediate the two positions just mentioned is adapted to open circuit both pairs of contacts.

Arms HA, HB and HC, adapted to oscillate about shaft I are provided with projections HA¹—HA², HB¹—HB², and HC¹—HC², respectively which are formed in the plane of movement of members EA, EB and EC. Members EA, EB and EC are provided with fingers adapted to selectively engage the projections of arms HA, HB and HC as member E is deflected over one or another of its five paths. Member EC is provided with a finger EC¹ adapted when member E travels over path H¹, H, N or L, to engage projection HC¹ of arm HC and turn the latter counter-clockwise as seen in Figs. 5 and 6 to thereby tilt switch VC to what may be termed a forward position. Member EC is provided with another finger EC² which is adapted, when the member E travels over path L¹ to engage projection HC² of arm HC turning the latter clockwise to thereby tilt switch VC into a back position. Member EB is provided with a finger EB¹ adapted to engage projection HB¹ of arm HB and turn the latter counter-clockwise when member E deflects over path H, N, L or L¹ thereby tilting switch VB to its forward position. Member EB is provided with another finger EB² adapted to engage projection HB² of arm HB when member E is deflected over path H¹, to turn arm HB clockwise thereby tilting switch B to its back position. Member A is provided with two fingers EA¹ and EA² each of which is provided with a high portion EAH or EAL and a low portion EAN. When member E is deflected over path H or $H^1$ the edge EAH is adapted to engage projection $HA^1$ of arm HA turning the latter counter-clockwise in Fig. 5 to tilt switch VA to its forward position. When member E is deflected over path L or $L^1$ the edge EAL is adapted to engage projection $HA^2$ of arm HA to turn the latter clockwise thereby tilting switch A to its back position. When member E deflects over its intermediate path the edge EAN of each finger $EA^1$ and $EA^2$ engages a projection $HA^1$ and $HA^2$ whereby arm EA is moved to a position intermediate its two extreme positions and switch A is lodged in its mid or neutral position. A table of the foregoing actions may be conveniently made as follows, in which F, B, and N denote the forward, backward, and neutral positions of switches VA, VB, and VC.

In the forward positions of the switches VA, VB, and VC, shown in Fig. 7, their contacts $d$, $e$, and $l$, respectively, are bridged by mercury while in their back positions, the contacts $c$, $g$, and $k$ of the switches VA, VB, and VC, respectively, are mercury connected.

Table No. 2

| Switch | Path of member E | | | | |
|---|---|---|---|---|---|
|  | $H^1$ | H | N | L | $L^1$ |
| VA | F | F | N | B | B |
| VB | B | F | F | F | F |
| VC | F | F | F | F | B |

There are control applications, to which the present invention is adapted, in which the control component resulting from the position of lever Q under control of the galvanometer, may be omitted without sacrifice to the accuracy of the control obtained. When it is desirable to eliminate this component, the pin $Q^1$ is removed from the full line position of Fig. 3 and placed in the aperture $QA^1$ which is provided for that purpose. The member 150 is thus rendered ineffective upon lever Q, and the latter will then be held in its neutral position by the engagement of pin $Q^1$ with the top edge of the instrument side plate.

Similarly the member S may be made ineffective upon the resulting control action by removing part $a^5$ from table $a$, removing the pin $C^4$ from its full line position of Fig. 3 and placing the latter in the aperture $CA^4$. The surface $OA^6$ of link $O^5$ will then engage and lift pin $C^4$ to the highest position of part S and each down movement of the latter will be terminated in its neutral position by engagement of pin $C^4$ with the top of the instrument side plate.

Although for many control applications the apparatus just described is sufficient, there are applications in which it is desirable to provide additional control instrumentalities. In instances, for example, where an off normal condition prevails but the condition is approaching normal, it is sometimes desirable to take more effective steps to check the condition approach to normal in order to prevent an overswing in the opposite direction. To this end I provide an additional switch and operating means therefor which I term a trend switch and which is controlled in direct response to the condition trend, as for example, by the galvanometer 2.

The trend switch T as shown in Fig. 3 is a mercury switch of the three position type in which contacts $h$, connected to the line, are adapted to be connected to one or another of two end contacts $f$ and $r$ or with a center contact $s$, accordingly as the switch is moved to one tilted position or the other or to its mid position. Switch T is carried by a frame $T^1$ journalled at $T^2$ coaxially with pivot $C^3$. An arm $T^3$ rigid with frame $T^1$ carries a pin $T^4$ engaged by a slot 151 at the outer end of member 150. The frame $T^1$ and arm $T^3$ are so arranged and proportioned with respect to member 150 that the latter in turning from one to another of its three positions will adjust frame $T^1$ about pivot $T^2$ into one of three corresponding positions in which one or another pair of three pairs of contacts $f$, $s$, or $r$ will be bridged and closed by the mercury pool. One pair of contacts of switch T will be closed in each operative position of member 150. When a falling trend of the condition causes member 150 to turn to its furthermost clockwise position as seen in Fig. 3, contacts $f$ will be closed; when a rising condition causes member 15 to assume its furthermost position in the counterclockwise direction, contacts $r$ will be closed; and with member 15 in its mid position in consequence of a stationary trend of the condition, contacts $s$ will be closed. In order that the no control action will result when member 15 is turning from one position to another, an interruptor switch U is provided.

Switch U is a two contact mercury switch carried by frame $U^1$ pivoted at $U^2$. The frame $U^1$ is provided with an extension $U^3$ carrying cam roller $U^4$, the roller being adapted to engage the edge of cam $U^5$ which is driven from the continuously rotating shaft 12. Cam $U^5$ is provided with a depression $U^{50}$ which permits the frame $U^1$ to turn clockwise once in each rotation of the cam to actuate the switch U to its closed position. The period during which the switch U remains closed is preferably adjustable and to this end the cam $U^5$ is made in two segmental and relatively adjustable parts. The two parts of the cam $U^5$ are so configured that, as they are manually relatively rotated about shaft 12, the size of depression $U^{50}$ is varied thereby varying the proportion of each rotation of cam $U^5$ during which switch U will be closed. The two segments are clamped together by screw $U^6$.

For further selective control purposes, other timed switch interruption provisions are made including switches $Ul$ and $Uh$ as shown in Figs. 3 and 3A. Switches $Ul$ and $Uh$, which are ordinary two contact mercury switches, are carried by frame UA, pivoted at $UA^1$, which is provided with roller $UA^2$. The roller $UA^2$ engages the edge of cam $UA^3$, corresponding in construction to cam $U^5$, and driven through suitable gearing of 1 to 1 ratio from shaft 12 whereby the switches $Ul$ and $Uh$ are tilted clockwise to their closed positions once in each rotation of shaft 12. The depression $UA^4$ of cam $UA^3$ is smaller, angularly, than depression $U^{50}$ of cam $U^5$ for reasons which will hereinafter appear, so that switches $Ul$ and $Uh$ will be closed for a shorter period in each rotation of shaft 12 than will be the switch U. The exact proportioning of the closed periods of switches U, $Ul$ and $Uh$ is governed by the adjustment of the segments respectively of cams $U^5$ and $UA^3$.

The manner in which control effects are produced through the operation of switches VA, VB, VC, T, U, $Ul$ and $Uh$ may take various forms of which the circuit diagram of Fig. 7 is an example. If the galvanometer 2 is responsive to temperature, for example, the fuel supply to a furnace burner or the like, for governing said temperature, may be supplied through the pipe $N^3$ having inserted therein the control valve $N^1$.

Control valve N¹ may be adjusted by means of the lever MN, the latter of which is positioned by the motor M. Motor M is of the reversible type having fields Mh and Ml adapted, when individually energized, to turn gearing M¹ in a direction to close or open, respectively, the valve N¹. Maximum and minimum limit switches as diagrammatically shown at MSl and MSh may be provided to limit the total extent of movement in either direction in a well-known manner as for example, by actuation through lever MN. The embodiment of Fig. 7 is shown especially for the purpose of illustrating the actuated control circuits, a preferred embodiment of my invention being illustrated in Fig. 8, later described.

From the foregoing it will be clear that switches VA, VB, VC and T are condition actuated, and switches U, Ul and Uh are cyclically actuated. Each of the circuits hereinafter traced includes in series, the switch U but only certain of the circuits include in series, switch Ul or Uh. The circuits including switch Ul or Uh in series, will be closed for a shorter period than those not including either of those switches due to the fact that the on period of those switches is shorter than the on period of switch U as previously described. The terms "shorter" and "longer" as hereinafter used refer to the time interval of energization of the controlling motor as for example, over circuits respectively including or not including switch Ul or Uh. Thus the circuits not including switch Ul or Uh provide more effective corrective action.

Whether the instrument shown in Figs. 1-6 is arranged to be jointly dependent upon the position of pen carriage 23 and galvanometer 2, or, as explained above may be the case, is wholly dependent on the position of the pen carriage 23, the member E has the five different paths of travel, indicated by the lines H', H, N, L, and L', in Fig. 4, and the switches A, B and C are arranged in one or another of five different position combinations according to the path of the member E. Furthermore, the ultimate effect upon the valve mechanism of the deflection of the member E over each of its paths will be determined by the then position of the switch T.

Thus, when the member E is deflected over its path H¹, and at that time the switch T is in its back position as it will be when the condition is rising, a circuit will be closed from the line LC, to switch U, conductor UT, through contacts r of switch T to the conductor TH and switch VB, through contacts g of the latter to the conductor BH, field Mh to the opposite side of the line LC¹ whereby the motor M will be energized to close the valve throughout the entire cycle. Another circuit will be completed from the line LC, switch U, contacts r, conductors TH and THC, contacts k of the switch VC, conductors CH and ACH, switch Uh, field Mh to the opposite side of the line LC¹ whereby motor M will be energized to close the valve for a period depending upon the adjustment of switch Uh, but the closure of the latter circuit is unimportant in view of the closure for a longer period of the above mentioned circuit including switch VB and conductor BH.

When the member E is deflected over its path H¹ and the switch T is then in its mid position as it will be when the trend of the condition is stationary, one circuit will be closed from the line LC to the switch U, conductor UT to contacts s of switch T, conductor TN to contacts d of switch VA, conductors AH and CH to the switch VC, through the contacts k thereof to the conductor THC, contacts g of switch VB to the conductor BH and directly through the field Mh of the motor M to the opposite side of the line LC¹ to energize the said motor to continuously close the valve throughout the longer period. Another circuit is closed from the line LC, switch U, conductor UT, contacts s of switch T to conductor TN, contacts d of switch VA, conductors AH and ACH, switch Uh, when closed, to the field Mh of the motor M and to the opposite side of the line LC¹, but the latter circuit opened and closed by the switch Uh is of no consequence in view of the concurrent energization of the field Mh through the former circuit.

When the member E is deflected over its path H¹ and at that time the switch T is in its forward position as shown in Fig. 7, which is its position when the trend of the condition is falling, no circuit will be completed to the motor M, because the conductor TL connected to line LC through contacts f runs to the then open contacts e and i of switches VB and VC, respectively.

When member E is deflected over its path H and at that time the switch T is in its back position as it will be when the trend of the condition is rising, a circuit will be closed from the line LC, switch U, conductor UT, contacts r of the switch T, conductor TH, conductor THC, contacts k of the switch VC, conductor CH, switch Uh, field Mh to the opposite line conductor LC¹ thereby energizing motor M to close the valve for the shorter period governed by the switch Uh.

When the member E deflects over its H path and at that time the switch T is in its mid position signifying a stationary trend, a circuit will be energized from the line LC, switch U, conductor UT, contacts s of the switch T, to conductor TN, contacts d of switch VA, conductors AH and ACH, switch Uh, field Mh to the opposite side of the line conductor LC¹ whereby motor M is energized to close the valve for the shorter period governed by the adjustment of switch Uh.

When the member E is deflected over its path H and at that time the switch T is in its forward position as it will be with a falling trend, a circuit will be completed from the line LC, switch U, conductor UT, switch T, contacts f thereof to conductor TL, conductor TB, contacts e of the switch VB, conductor BL, conductor ABL, switch Ul, field Ml to the opposite side of the line LC¹, whereby the motor M is energized in a direction to open the valve for the shorter period governed by the adjustment of the limit switch Ul.

When the member E is deflected over its path N and at that time the switch T is in its forward position as it will be when the trend of the condition is rising, a circuit will be closed from the conductor LC, switch U, conductor UT, contacts r of the switch T, conductor TH, conductor THC, contacts k of the switch VC, conductor CH, conductor ACH, switch Uh, field Mh to the opposite side of the line LC whereby motor M will be energized to close the valve for the shorter period governed by the adjustment of the switch LH.

When member E is deflected over its neutral path N and at that time the switch T is in its neutral position as it will be with a stationary trend condition, no circuits will be completed and no movement of the motor M will occur.

When member E is deflected over its normal path N and at that time the switch T is in its forward position as it will be when the trend of the condition is falling, a circuit will be closed from conductor LC, switch U, conductor UT, contacts f of the switch T, conductor TL, conductor TB, contacts e of the switch VB, conductor BL, conductor ABL, switch Ul, field Ml to the opposite line conductor LC¹ whereby motor M will be energized to open the valve for the shorter period governed by the switch Ul.

When the member E is deflected over its path L and at that time the switch T is in its back position as it will be when the trend of the condition is rising, a circuit will be closed from the line conductor LC, switch U, conductor UT, contacts r of switch T, conductor TH, conductor TCH, contacts k of switch VC, conductors CH and ACH, switch Uh to field Mh, thereby energizing motor M to close the valve for a shorter period.

When the member E is deflected over its path L and at that time the switch T is in its neutral position as it will be when the trend is stationary, a circuit will be closed from the conductor LC, switch U, conductor UT, contacts s of the switch T, conductor TN, contacts c of the switch VA, conductors AL and ABL, switch Ul, field Ml of the motor M to line conductor LC¹ whereby the motor M will be energized to open the valve for a shorter period.

When member E is deflected over its path L and at that time the switch T is in its forward position as it will be when the trend of the condition is falling, a circuit will be closed from the conductor LC, switch U, conductor UT, contacts f of the switch T, conductor TL, conductor TB, contacts e of the switch VB, conductor BL, conductor ABL, switch Ul, field Ml to the opposite line conductor LC¹ to energize motor M for a shorter period in the opening direction.

When member E is deflected over its path L¹ and switch T is then in its back position as it will be when the condition is rising, no energizing circuits for motor M will be completed.

When the member E is deflected over its path L¹ and switch T is then in its neutral position signifying a stationary trend condition, a circuit will be closed from line LC, switch U, conductor UT, contacts s of switch T, conductor TN, contacts c of switch VA, conductors AL and BL, contacts e of switch VB, conductor TB, contacts l of switch VC, conductor CL, field Ml to line LC¹ thereby energizing motor M for a longer period in the opening direction. Another circuit is closed from conductor AL to conductor ABL, switch Ul, field Ml to line LC¹, but this circuit is not significant in view of the former circuit.

When the member E is deflected over its path L¹ and at that time the switch T is in its forward position as it will be when the trend of the condition is falling, a circuit will be closed from line LC, contacts f of the switch T, conductor TL, contacts l of the switch VC, conductor CL, field Ml of the motor M to the opposite side of the line conductor LC¹ whereby the motor M will be energized to open the valve for a longer period. Simultaneously a circuit will be closed from the conductor TL, conductor TB, contacts e of the switch VB, conductor BL, conductor ABL, switch Ul, field Ml of the motor M to the line conductor LC¹, but the brief closure of the latter circuit is without significance in view of the longer closure of the circuit including the switch VC and conductor CL.

In Fig. 8 I have diagrammatically illustrated a preferred embodiment of my invention comprising two coacting control instruments Y and Z. The control instrument Z creates control effects in accordance with variations in one variable from a normal value which is fixed by the adjustment of normal value; or neutral, adjusting means included in the instrument Z. The instrument Y is responsive to a second variable which is related to the first mentioned variable, and operates to adjust the normal value adjusting means of the instrument Z in accordance with variations in said second variable related to the variable to which the instrument Z responds.

In the specific control arrangement illustrated in Fig. 8, the variable to which the instrument Z responds, is the furnace temperature, impressed on a temperature responsive device ZT, of a fluid heater X, the latter being heated by the combustion of fluid fuel supplied to the heater burner ZA by a supply pipe ZB at a rate dependent on the adjustment of a control valve ZC which is adjusted by the instrument Z. The heater X, which may be an oil still, milk heater, or the like, is employed to heat fluid passing through heater pipes XB connected between a fluid supply pipe XA and a fluid delivery pipe XC. The instrument Y is responsive to the delivery temperature, impressed on a temperature responsive device YT, of the fluid heated, as it passes from the heater pipes XB through the delivery pipe XC.

The character of the temperature conditions to which the thermoresponsive devices ZT and YT respond, and of the control to be effected, make it practically essential that the devices ZT and YT should be resistance thermometer bulbs or thermocouples subjecting the instruments Z and Y, respectively, to relatively minute electric force variations in accordance with the changes in the temperatures to which the element ZT and YT are subjected. Because of the smallness of the electric force variations produced by the devices ZT and YT, each of the instruments Y and Z must include a galvanometer or equivalent delicate device, sufficiently sensitive to the small electric force variations produced by the corresponding device ZT or YT. The normal value or neutral adjusting mechanism of the instrument Z is advantageously a reversible electric motor MA. For the control of that motor as required for the purposes of the control arrangement shown in Fig. 8, it is essentially advantageous that the instrument Y should be of the type illustrated in Figs. 1–7. As shown, the instrument Y controls the motor MA through circuit connections like those provided in Fig. 7 for the control of the motor M, the conductors YZL and YZH of Fig. 8 corresponding to the conductors MSl and MSh, respectively of Fig. 7.

With the galvanometer or equivalent device of the instrument Z responding to the relatively slowly occurring furnace temperature changes to which the device ZT responds, but having its control effects modified through the motor MA and instrument Y in response to the more rapidly occurring changes in magnitude and trend of change of the fluid delivery temperature to which the device YT responds, it is especially advantageous to use a control instrument Z of the special type hereinafter described.

For the purposes of the present invention, the instrument Z may include a control carriage 23 mounted and adjusted by mechanism including potentiometer measuring and rebalancing means of the character illustrated in Figs. 2–4. The instrument Z may also include a control table A which is adjusted by a shaft B as in the instrument first described, but in the instrument Z the shaft B is rotated by the motor MA.

In respect to its control provisions, the instrument Z advantageously differs widely from the instrument illustrated in Figs. 1–7, and has its control action wholly dependent on the relative position of its table A and carriage 23 along the path of movement of the latter. Changes in said relative position give bodily movements to the bar C of the instrument Z, transversely to the path of movement of the carriage 23. Those bodily movements produce control effects by adjustments thereby given to the flapper valve mechanism of pneumatic control apparatus which may be of known type, and is characterized by the fact that an initial effect, due to an adjustment of the bar C in the pressure through which the fuel supply valve ZC is controlled, produces a quickly occurring follow-up adjustment of said pressure, partially neutralizing the initial change therein, and a subsequent delayed compensating adjustment neutralizing the effect of the follow-up adjustment.

The described control provisions of the instrument Z form simple and effective means for adjusting the fuel valve ZC, which may be a fluid pressure motor valve of known type, in a manner well adapted to minimize hunting of the control system. The instrument Z thus effects anti-hunting control effects in a somewhat simpler manner, and with simpler and less expensive mechanism, than does the instrument Y. The control provisions of the instrument Z, while well adapted for the control of a fuel valve, are not as well adapted for the control of an electric motor as are the control provisions of the instrument Y, which is desirably employed for this reason, and also because of the advantageous use in the control system illustrated of the special anti-hunting features of the instrument Y.

To make the position of the bar C dependent on the relative positions of the table A and carriage 23, along the path of movement of the latter, the bar C is provided with a part $A^{50}$ constantly engaging a supporting surface of the carriage 23, in the form of a roll 23R, against which the edge of the plate $a^{50}$ bears at all times in normal operation. The bar C is pivotally connected at one end to one end plate of the instrument frame at $C^3$, as illustrated in Fig. 4, and is connected at its other end to the other end plate by an arm $C^{10}$ and pivot $C''$ coaxial with the pivot $C^3$, so that the bar is raised or lowered as relative movements of the table A and carriage 23 along the path of movement of the latter, cause the roll 23R to engage the part $a^{50}$ at different points of its inclined edge portion $a^{51}$.

In the table A of the instrument Z, the part $a^{50}$, which is removable, replaces the step piece $a^5$ of Fig. 2. In the control condition range in which adjustment of the valve ZC is desirable, the roller 23R engages the inclined edge portion $a^{51}$ of the part $a^{50}$, and the latter is raised or lowered and the valve ZC closed or opened, accordingly as the carriage 23 moves to the right or left relative to the table A. When the roller 23R engages the horizontal edge portion of the part $a^{50}$, at the right of its inclined edge portion $a^{51}$, the valve ZC is fully closed, or in its minimum fuel flow condition. At the other end of the control range, the down movement of the bar C is limited by the engagement of its supporting arm $C^{10}$ with the corresponding end plate of the instrument framework.

An extension arm $C^{12}$ is connected to the arm $C^{10}$ by an eccentric screw $C^{13}$ and clamping screw $C^{14}$, for angular adjustment relative to the arm $C^{10}$ about the common axis of the pivots $C^3$ and $C^{11}$. A link $C^{15}$ connected to the arm $C^{12}$ at $C^{16}$, is connected at its lower end $C^{17}$ to a lever $C^{20}$, fixed to a shaft $C^{19}$ which is journalled in the adjacent instrument side plate. Another lever arm $C^{18}$ fixed to the shaft $C^{19}$, is connected to the upper end of a vertical link $C^{21}$. As shown, the link $C^{21}$ extends, downwardly through the bottom wall of the instrument casing $C^{50}$ enclosing the portion of the instrument Z already referred to. When, as is usual, the mechanism normally within the casing is carried by a frame $C^{51}$, connected by a hinge $C^{52}$ to the casing $C^{50}$ so that the mechanism can be swung out of the casing for adjustment and repair, the link $C^{21}$ may extend through an axial passage formed in the hinge $C^{52}$. The link $C^{21}$ is connected at its lower end to a lever $C^{22}$ forming an actuating element for the pneumatic control mechanism. The latter is located beneath, but may be connected to, and supported by the instrument casing $C^{50}$. The lever $C^{22}$ is journaled on a pivot $C^{23}$ adjustable as hereinafter described, and has a gravitational bias to turn counter-clockwise into engagement with the upper edge of an adjustable nut $C^{24}$ carried by link $C^{21}$. The camming action of roller 23R on member $a^{50}$, as carriage 23 deflects, thus raises and lowers the link $C^{21}$ and oscillates the lever $C^{22}$.

The pneumatic control provisions shown in Fig. 10 and of which the lever $C^{22}$ forms the actuating element, are of known type, which is fully disclosed in the prior application of Coleman B. Moore, Serial No. 43,487, filed October 4, 1935. They comprise a flapper valve element $Z^5$ mounted to turn about a stationary pivot $Z^4$, to turn toward and away from the nozzle element $Z^6$ of said mechanism. The nozzle element $Z^6$ is a pipe having a bleeder or discharge orifice at its end adjacent the flapper $Z^5$, and receives air at its other end, which is supplied by a pipe $Z^7$ at a suitable and approximately constant pressure, to a channel $Z^8$ in a pilot valve housing $Z^9$. The passage $Z^8$ is normally in communication with the nozzle pipe $Z^6$ through a restricted passage or orifice formed by the bore of a small diameter pipe $Z^{10}$, so that the pressure in the pipe $Z^6$ will normally be less than the pressure in the pipe $Z^7$, by an amount which depends upon the position of the flapper valve $Z^5$ and the resultant freedom for air to bleed to the atmosphere from the nozzle element $Z^6$. The variable pressure thus maintained in the pipe $Z^6$ is a primary control pressure transmitted by a branch pipe $Z^{11}$ to the chamber $Z^{12}$ of a pilot valve mechanism including a valve member $Z^{13}$. The latter admits air from the channel $Z^8$ to a second pilot valve chamber $Z^{15}$ through a port $Z^{14}$, or permits air to discharge to the atmosphere from the chamber $Z^{15}$ through a bleed port $Z^{16}$, as required to maintain a pressure in the chamber $Z^{15}$ which is proportional to the primary control pressure in the nozzle pipe $Z^6$. The chambers $Z^{12}$ and $Z^{15}$ are separated by a flexible wall to which the valve member $Z^{13}$ is secured.

The pressure in the chamber $Z^{15}$ is the ultimate control pressure, and is transmitted by the pipe ZD to the pressure chamber of the pressure motor fuel control valve ZC. The pressure in the chamber $Z^{15}$ is also transmitted by a pipe $Z^{17}$ to the apparatus for producing the previously mentioned follow-up and compensating adjustments of the primary control pressure in the nozzle pipe $Z^6$, and thereby of the ultimate control pressure in the chamber $Z^{15}$. Said apparatus, as hereinafter explained, controls the position of the pivot $C^{23}$, and thereby modifies the effect of the lever $C^{22}$, on the flapper valve $Z^5$. The pipe $Z^{17}$ opens into a chamber $Z^{18}$ between a rigid casing member $Z^{19}$ and bellows $Z^{20}$ within the casing. The casing $Z^{19}$ and bellows $Z^{20}$ are each secured at one end to a stationary supporting structure part $Z^{21}$. The bellows $Z^{20}$ has its opposite end closed, and forms a movable wall of the chamber $Z^{18}$. Within and coaxial with the bellows $Z^{20}$ is a smaller bellows $Z^{22}$ which has its outer end secured to the part $Z^{21}$ and has its inner end closed. The interior of the bellows $Z^{22}$ is open to the atmosphere, through an opening in the part $Z^{21}$.

The interbellows space $Z^{23}$ between the bellows elements $Z^{20}$ and $Z^{22}$, communicates through a pipe $Z^{24}$ including an adjustable flow throttling device $Z^{25}$, with the interbellows spaced $Z^{26}$ between bellows elements $Z^{27}$ and $Z^{28}$, respectively similar in their general arrangement to the bellows $Z^{20}$ and $Z^{22}$, but facing in the opposite direction, so to speak, and each having one end secured to a stationary supporting structure part $Z^{210}$. The bellows $Z^{28}$ is exposed internally to the pressure of the atmosphere and has its closed movable end wall connected by a thrust or connecting rod $Z^{29}$ to the closed movable end wall of the bellows $Z^{22}$. The bellows $Z^{27}$ is enclosed by a casing $Z^{30}$ which is secured to the supporting structure part $Z^{210}$, and is formed with an opening or openings $Z^{31}$, so that the bellows $Z^{27}$ is subjected externally to atmospheric pressure at all times. The effect of the wall resilience of each of the bellows elements $Z^{20}$, $Z^{22}$, $Z^{27}$ and $Z^{28}$ which tends to give the element a predetermined normal length, and to regulate its contraction and expansion under the operating forces to which it is subjected, is modified, in the arrangement shown, by a spring $Z^{32}$ acting on the bellows $Z^{27}$, in the direction to oppose the expansion of the latter, and by a spring $Z^{33}$ within each of the bellows $Z^{22}$ and $Z^{28}$. Each spring $Z^{33}$ acts between the closed end of the corresponding bellows and supporting part $Z^{21}$ or $Z^{210}$, to oppose the contraction of the bellows.

The lever $C^{22}$ acts on the flapper valve $Z^5$ through a pin $C^{25}$ carried by the lever at some distance from its fulcrum pivot $C^{23}$. The valve $Z^5$ is spring biased for movement into the position in which it cuts off the discharge through the nozzle $Z^6$, and the position of the pin $C^{25}$ determines the closeness of approach to the nozzle $Z^6$ permitted the valve $Z^5$. The position of the pin $C^{25}$ depends both upon the angular adjustment of the lever $C^{22}$ about its supporting pivot $C^{23}$, determined by the position of the bar C, and upon the position of the pivot $C^{23}$ which is adjusted by the longitudinal adjustment of the thrust bar or connecting rod $Z^{29}$ connecting the movable ends of the bellows members $Z^{22}$ and $Z^{28}$. The means through which rod $Z^{29}$ thus adjusts the pivot $C^{23}$, comprise a lever support $Z^{34}$ for the pivot $C^{23}$, which is pivoted to turn about a stationary pivot $Z^{35}$, and means controlling the extent of turning movement permitted the lever $Z^{34}$ under the action of a bias spring which tends to turn the lever in the clockwise direction as seen in Fig. 10.

The last mentioned means comprises a lever $Z^{36}$ journalled on a stationary pivot $Z^{37}$ and acting on the lever $Z^{34}$ through an interposed thrust pin $Z^{38}$, and acted on in a direction to oppose bias spring movement of the lever $Z^{34}$, by a thrust part $Z^{290}$ carried by the thrust or connecting rod $Z^{29}$. Preferably, the part $Z^{290}$ is adjustably mounted on the rod $Z^{29}$, so that the angular position of the lever $Z^{36}$ corresponding to a particular longitudinal adjustment of the rod $Z^{29}$, may be varied. Advantageously, the thrust pin $Z^{38}$ is adjustable in the direction of the length of the surfaces of the lever $Z^{34}$ and $Z^{36}$ engaging the opposite sides of said pin. To that end, as shown, the pin $Z^{38}$ is carried by a lever or arm $Z^{39}$ pivoted at $Z^{40}$ to a sliding support $Z^{41}$, which may be adjusted in a direction transverse to the rod $Z^{29}$, by rotation of the gear $Z^{42}$ in mesh with rack teeth carried at one edge of the part $Z^{41}$.

In the operation of the apparatus shown in Figs. 8, 9, and 10, a movement of the pen carriage 23 of the instrument Z to the right relative to the instrument table A, when the roller 23R is in engagement with the inclined edge $a^{51}$ of part $a^{50}$, produces an up movement of the bar C, whereby the heat supply to the heater X is reduced. The up movement of the bar C turns the lever $C^{22}$ about its pivot $C^{23}$ in the counter-clockwise direction as seen in Fig. 10. Such movement of the lever $C^{22}$ acts through the corresponding adjustment of the pin $C^{25}$ to move the flapper valve $Z^5$ toward the nozzle $Z^6$, and thereby increases the control pressure transmitted from the valve chamber $Z^{15}$ to the pressure chamber of the fuel regulating valve ZC, whereby the latter is actuated to decrease the fuel supply to the fluid heater X.

The initial change in the ultimate control pressure effected in the manner just described, is quickly neutralized in part by the follow-up adjustment caused by the resultant change in the pressure transmitted to the chamber space $Z^{18}$ from the valve chamber $Z^{15}$ through the pipe $Z^{17}$. The increase in pressure in chamber $Z^{18}$ results in a compression of the bellows $Z^{20}$. As a net result of the resilient forces and the internal atmospheric pressure acting on the bellows $Z^{22}$, the compression of the bellows $Z^{20}$ results in a corresponding compression of the bellows $Z^{22}$ and movement of the connecting rod $Z^{29}$ and its thrust part $Z^{290}$ to the left, causing a counter-clockwise movement of the lever $C^{34}$ and a corresponding movement of the pin $C^{23}$, whereby the effect of the initial counter-clockwise adjustment of the lever $C^{22}$ on the position of the flapper valve $Z^5$, is partially neutralized. This follow-up adjustment occurs almost immediately following the initial change in the ultimate control pressure.

The subsequent delayed compensating adjustment results from the increase in the pressure within the interbellows space $Z^{23}$ relative to the pressure in the interbellows space $Z^{26}$ which occurs when the bellows $Z^{20}$ is compressed. That relative pressure change results in a transfer of fluid, preferably a liquid, from the space $Z^{23}$ to the space $Z^{26}$, through the pipe $Z^{24}$, tending to equalize the pressures in the two interbellows spaces. As the pressure in the space $Z^{23}$ is thus decreased relative to the pressure in the space $Z^{26}$, the volume of the space $Z^{26}$ increases, and the bellows $Z^{22}$ expands, while the bellows $Z^{26}$ contracts. The connecting rod $Z^{29}$ is thus given a movement to the right and the effect of its previous follow-up adjustment movement on the position of the lever $C^{34}$ and pivot $C^{23}$, is thereby neutralized, or cancelled out. The rate at which the compensating adjustment is effected, depends, of course, upon the effective flow capacity of the equalizing passage $Z^{24}$, and may be varied in accordance with the requirements of the control system by adjustment of the valve $Z^{25}$.

Actions which are the converse of those just described, occur when the initial control pressure change results from a down movement, instead of an up movement of the control bar C. Further explanations with respect to the construction and operation of the mechanism of the instrument Z for effecting follow-up and compensating adjustments, are unnecessary herein, as said mechanism is not claimed as novel per se, herein, but forms the subject matter of the above mentioned copending application Ser. No. 43,487. As has been explained, however, the combination of the instruments Y and Z in a control system, as disclosed herein, is novel and advantageous.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with control apparatus, of means deflecting in accordance with variations in a controlling quantity, means deflecting in accordance with variations in the magnitude of said quantity, control devices, means for selectively adjusting said devices in joint response to the deflections of said deflecting means, a control device, means for adjusting the last mentioned device in selective accordance with the variations in said quantity, and means cooperating with all of said devices for producing control effects jointly dependent on the positions of the said devices.

2. In a control system the combination of means responsive to one variable, means responsive to a second variable related to the first mentioned variable, and an adjustable control device adapted by its adjustment to modify each variable, a control instrument including normal value adjusting means and actuated by the second mentioned means to adjust said control device in accordance with variations of said second variable from a normal value of the latter determined by the adjustment of said adjusting means, and a second control instrument actuated by the first mentioned means and including a member deflecting in accordance with variations in the first mentioned variable, and including a member deflecting in accordance with the varying magnitude of the first mentioned variable, for periodically adjusting said value adjusting means.

3. In a control system, the combination with means for creating an electric force varying in accordance with changes in the value of one variable, means for creating a second electric force varying in accordance with the variations in a second variable related to the first mentioned variable, a fluid pressure actuated device for producing control effects modifying each of said variables, a control instrument including potentiometric measuring means responsive to said second force and including a fluid pressure control mechanism for subjecting said device to a control pressure dependent on the variations of said second force from a normal value thereof, and including an electric motor for adjusting said mechanism to vary said normal value, and a second control instrument comprising potentiometric measuring means responsive to the first mentioned force and including a relay mechanism and circuit controlling means actuated thereby to selectively operate said motor in accordance with variations in the first mentioned force.

4. The combination in a potentiometer control instrument comprising a galvanometer deflecting in accordance with variations in a control quantity of a member positioned in accordance with the galvanometer deflection, an element positioned in accordance with the magnitude of said quantity control means adjustable to different positions, means jointly responsive to the positions of said member and said element for selecting one of said positions, another control means, means for adjusting the last mentioned control means into different positions in accordance with the variations in the control quantity, and means cooperating with said control means for producing control effects jointly dependent upon the positions of the first and second mentioned control means.

5. The combination in a potentiometer control instrument comprising a galvanometer deflecting in accordance with variations in a control quantity, and a member positioned in accordance with the galvanometer deflection, an element positioned in accordance with the magnitude of said quantity, of control means adjustable to different positions, means jointly responsive to the positions of said member and said element for selecting one of said positions, another control means, means for adjusting the last mentioned control means into different positions in accordance with the variations in the control quantity, and means cooperating with said control means for producing control effects jointly dependent upon the positions of the first and second mentioned control means.

6. The combination in a balanced control instrument comprising an element deflecting in accordance with variations in a control quantity, of a member controlled by the deflection of said element, a second element positioned in accordance with the magnitude of said quantity, control means adjustable to different positions, means jointly responsive to the positions of said elements for selecting one of said positions, another control means, means for adjusting the last mentioned control means into different positions in accordance with variations in the control quantity, and means cooperating with said control means for producing control effects jointly dependent upon the positions of the first and second mentioned control means.

7. The combination with a tubular fluid heater including a heat supply regulator, of controlling means for said regulator, comprising a device responsive to a heater temperature, a control instrument comprising a member deflecting in accordance with variations in the magnitude of said temperature, an electric motor, a member deflected by said motor, and pneumatic control means for subjecting said regulator to control effects jointly dependent on the deflections of said members, a device responsive to the temperature of the fluid heated, and a control instrument including circuit controlling means for said motor, and means actuated by the last mentioned device for operating said motor or maintaining it out of operation accordingly as the temperature to which the fluid is heated varies or is constant, respectively, whereby said second mentioned member is adjusted in accordance with variations in the temperature to which the fluid is heated.

8. The combination with a tubular fluid heater including a heat supply regulator of controlling means for said regulator, comprising a device responsive to a heater temperature, a control instrument comprising a member deflecting in accordance with variations in the magnitude of said temperature, an electric motor, a member deflected by said motor, and pneumatic control means for subjecting said regulator to control effects jointly dependent on the deflections of said members, a device responsive to, and creating electric force variations corresponding to variations of the temperature of the fluid heated, and a potentiometric control instrument including circuit controlling means for said motor, and means actuated by the last mentioned device, for operating said motor in accordance with the magnitude, and with variations in the magnitude, of the temperature to which the fluid is heated.

9. Control apparatus comprising in combination, a device responsive to variations in value of a variable control quantity, a control circuit network including a three position switch and other switches, and adjusting mechanism controlled by said device and including means for adjusting the three position switch into one or another of three positions accordingly as the value of said quantity is increasing, decreasing, or stationary, means for effecting different relative adjustments of said other switches selectively dependent on the value of said quantity, and means adapted to produce control effects selectively dependent both on the relative adjustment of said other switches and on the position of said three position switch.

10. Control apparatus comprising in combination, a device responsive to variations in value of a variable control quantity, a control circuit network including a three position switch and other switches, and adjusting mechanism controlled by said device and including means for adjusting the three position switch into one or another of three positions accordingly as the value of said quantity is increasing, decreasing, or stationary, means for effecting different relative adjustments of said other switches selectively dependent both on the value of said quantity and on the variations in said value, and means adapted to produce control effects selectively dependent both on the relative adjustment of said other switches and on the position of said three position switch.

11. Control apparatus comprising in combination a device responsive to variations in value of a variable control condition, a control circuit network including a three position switch and other switches, and adjusting mechanism controlled by said means and including means for adjusting the three position switch into one or another of three positions accordingly as the value of said quantity is increasing, decreasing, or stationary, means for effecting different relative adjustments of said other switches in selective accordance with the difference between the actual value of said quantity, and a predetermined normal value thereof, and means adapted to produce control effects selectively dependent both on the relative adjustment of said other switches and on the position of said three position switch.

12. In a potentiometric control instrument, the combination with a device deflecting in accordance with the rate of change in a control quantity, of mechanism controlled by said device and comprising a member adjusted into one or another of three positions accordingly as the value of said quantity is rising, falling, or stationary, a second member adjusted into different positions according to the different values of said quantity, circuit controlling provisions including a three position switch operatively connected to the first mentioned member for adjustment into positions corresponding respectively to the different first mentioned positions, and other switches adjusted into different relative positions by adjustments of said second member into different positions, and means adapted to produce control effects selectively dependent both on the relative adjustment of said other switches and on the position of said three position switch.

13. In a potentiometric control instrument, the combination with a device deflecting in accordance with the rate of change in a control quantity, of mechanism controlled by said device comprising a member adjusted into one or another of three positions accordingly as the value of said quantity is rising, falling, or stationary, a second member adjusted into different positions according to the different values of said quantity, and circuit controlling provisions including a three position switch operatively connected to the first mentioned member for adjustment into positions corresponding respectively to the different first mentioned positions of the first mentioned member including other switches, and means for adjusting said other switches into positions selectively dependent on the adjustment of each of said members, and means adapted to produce control effects selectively dependent both on the relative adjustment of said other switches and on the position of said three position switch.

14. In a cyclically operating electrical control apparatus, a member deflecting in accordance with the variations of a variable condition, a control motor, an electrical control network for said motor, a mercury switch mounted for angular adjustment about a first pivot into a plurality of positions for controlling said motor by adjusting said network, means for adjusting said switch under control of said member into one or another of said positions including a part angularly adjustable about another pivot periodically adjusted into a position corresponding to the position of said member and connected to said switch, the said part having a movement from an initial position to the position corresponding to the position of said member in each cycle of operation, and a periodically operated switch for interrupting said network during the period of movement of said part from said initial position into its position corresponding to the position of said member.

15. In a cyclically operating electrical control apparatus, a member deflecting in accordance with the variations of a variable condition, a control motor, an electrical control network for said motor, an angularly adjustable control element having a plurality of positions for controlling said motor by adjusting said network, means for adjusting said element under control of said member into one or another of said positions including a part having a path of movement crossing the plane of deflection of said member and adapted to be intercepted in its path of movement by engagement with said member, a second part periodically adjusted into a position corresponding to the position of the first mentioned part and connected to said element, the second mentioned part having a movement from an initial position to the position corresponding to the position of said first part in each cycle of operation, and a periodically operated switch for interrupting said network during the period of movement of said second part from said initial position into its position corresponding to the position of said first part.

16. In a cyclically operating electrical control apparatus, a member deflecting in accordance with the variations of a variable condition, a control motor, an electrical control network for said motor, an angularly adjustable element having a plurality of positions for controlling said motor by adjusting said network, means for adjusting said element under control of said member into one or another of said positions including a device oscillatable into a position corresponding to the position of said member, and a second device connecting said element and the first mentioned device and movable into a position corresponding to the position of the latter, and a periodically operated switch for interrupting said network during the period of adjustment of said element by said means.

17. In a cyclically operating electrical control apparatus, a member deflecting in accordance with the variations of a variable condition, a control motor, an electrical control network for said motor, an angularly adjustable control element having a plurality of positions for controlling said network, means for adjusting said element under control of said member into one or another of said positions, and a periodically operated switch for interrupting said network during the period of adjustment of said element by said means.

18. In a cyclically operating electrical control apparatus, a member deflecting in accordance with the variations of a variable condition, a control motor, an electrical mercury switch having a plurality of angular positions, means for selectively adjusting said switch under control of said member into one or another of said positions, circuits selectively energized by said mechanism according to its selected position, a second mercury switch in series with the first mentioned switch for interrupting said circuits during the movement of said switch from one to another of its positions.

19. In cyclically operating electrical control apparatus, a member deflecting in accordance with the variations of a variable condition, a control motor for controlling said condition, an electrical switch mechanism, means for selectively adjusting said switch mechanism under control of said member into one or another of a plurality of positions, circuits selectively energized by said switch mechanism in accordance with the deflections of said member and means for interrupting said circuits during a mechanism adjustment period in each cycle.

20. In cyclically operating control apparatus, a member deflecting in accordance with the variations of a variable condition, a control motor, control instrumentalities for adjusting said motor, mechanism cooperating with said member and instrumentalities for setting the latter in accordance with the deflections of the member, means rendering the said instrumentalities ineffective upon said motor during a setting period in each cycle.

21. Apparatus as specified in claim 20, in which the said mechanism cooperates first with the said member and then with the instrumentalities during each said setting period.

22. In cyclically operating control apparatus, a member deflecting in accordance with the variations of a variable condition, mechanism cooperating therewith for periodically adjusting control instrumentalities for controlling said condition and including an element adjusted cyclically and adapted by its adjustment to render said mechanism operative during one period and inoperative during another period of each cycle, and means maintaining the preceding adjustment of said control instrumentalities during the following inoperative period of said mechanism.

23. The combination in a control instrument comprising means responsive to variations in a control quantity and means for measuring the magnitude of said quantity, control means jointly controlled by said first and second mentioned means, second control means controlled by the first mentioned means independently of the first control means, a device for controlling said quantity, and means jointly controlled by the first and second control means for controlling said device.

24. In a cyclically operating electrical control apparatus, means responsive to a variable condition, a control motor, an electrical control network for said motor, a plurality of mercury switches each operated in each cycle for a different fixed period independently of said means, switching means controlled by the first mentioned means for selectively controlling said network in accordance with the value of said condition to include a selected number of said switches and thereby control the period of energization of said motor.

25. In apparatus as specified in claim 24, means for adjusting the said fixed periods of operation of said mercury switches.

26. In a cyclically operating electrical control apparatus means responsive to a variable condition, a reversible control motor, an electrical control network for said motor, a first switch periodically operated to its active position for controlling the period of energization of said motor in one direction, a second switch periodically operated to its active position for controlling the period of energization of said motor in the opposite direction, a third switch operated to its active position for a period longer than the previously mentioned periods and switching means controlled by the first mentioned means to energize the motor in one direction over a circuit including the first mentioned switch on a small departure of the condition in one sense; to operate said motor in the same direction over a circuit not including said first switch but including the third switch on a further departure of the condition in the same sense; to operate said motor in the opposite direction over a circuit including the second switch on a small departure of the condition in the opposite sense; and to operate said motor in said opposite direction over a circuit not including said second switch but including said third switch on a further departure of the condition in said opposite sense.

27. In a control system, the combination with one instrument having an element deflecting in accordance with changes in the value of one variable, a second control instrument having an element deflecting in accordance with changes in the value of a second variable related to the first mentioned variable, a fluid pressure actuated device for producing control effects modifying each of said variables, the first control instrument having means controlled by the first mentioned element including a fluid pressure control mechanism for subjecting said device to a control pressure dependent on the deflections of said second element from a normal position thereof and including rotative means for adjusting said mechanism to vary said normal value and an electrical motor controlling said rotative means, the said second control instrument having means controlled by the second mentioned element and including relay mechanism and circuit controlling means actuated thereby to selectively operate said motor in accordance with the deflections of the second mentioned element away from a predetermined position of the latter and to maintain said motor out of operation when said element is in said predetermined position.

28. In a control system for a fuel burning heater for heating a substance, the combination of means responsive to the temperature to which said substance is heated by said heater, means responsive to a heater temperature, an adjustable control device adapted by its adjustment to vary the supply of fuel to said furnace and thereby modify each of said temperatures, a control instrument including normal value adjusting means and actuated by the second mentioned means to adjust said control device in accordance with variations of the second mentioned temperature from a normal value of the latter determined by the adjustment of said adjusting means, and a second control instrument actuated by the first mentioned means and including a member deflecting in accordance with variations in the first mentioned temperature, and including a member deflecting in accordance with the varying magnitude of the first mentioned temperature for adjusting said value adjusting means.

29. In a control system for a fuel burning heater for heating a substance, the combination with means for creating an electrical force varying in accordance with changes in the temperature to which the substance is heated by said heater, means for creating a second electric force varying in accordance with the variations in a second temperature in said heater, a fluid pressure actuated device adapted by its adjustment to vary the supply of fuel to said heater, a control instrument including potentiometric measuring means responsive to said second force and including a fluid pressure control mechanism for subjecting said device to a control pressure dependent on the variations of said second force from a normal value thereof, and a second control instrument comprising potentiometric measuring means responsive to the first mentioned force and including controlling means actuated thereby and in accordance with variations in the first mentioned force, and adapted to cooperate with said fluid pressure control mechanism to control said device.

ANKER E. KROGH.